US006366847B1

(12) United States Patent
Sun et al.

(10) Patent No.: US 6,366,847 B1
(45) Date of Patent: Apr. 2, 2002

(54) METHOD OF ESTIMATING BAROMETRIC PRESSURE IN AN ENGINE CONTROL SYSTEM

(75) Inventors: Jing Sun, Bloomfield Township; Narayanan Sivashankar, Canton, both of MI (US)

(73) Assignee: Ford Global Technologies, Inc., Dearborn, MA (US)

( * ) Notice: Subject to any disclaimer, the term of this patent is extended or adjusted under 35 U.S.C. 154(b) by 0 days.

(21) Appl. No.: 09/649,780

(22) Filed: Aug. 29, 2000

(51) Int. Cl.[7] ......................... G06F 15/78; G06F 19/00; F02D 45/00

(52) U.S. Cl. ..................... 701/103; 73/118.2; 73/117.3; 123/494

(58) Field of Search ................................ 123/677, 478, 123/494, 406.49; 701/102, 103, 114; 73/116, 117.3, 118.1, 118.2

(56) References Cited

U.S. PATENT DOCUMENTS 4,926,335 A 5/1990 Flowers et al.
5,012,422 A * 4/1991 Takahashi et al. ......... 73/118.2
5,020,363 A 6/1991 Schnaibel et al.
5,070,846 A * 12/1991 Dudek et al. ............... 123/494
5,136,517 A 8/1992 Cullen et al.
5,494,018 A * 2/1996 Black et al. ................ 123/478
5,615,657 A * 4/1997 Yoshizawa .................. 123/494
6,016,460 A 1/2000 Olin et al.

* cited by examiner

*Primary Examiner*—Willis R. Wolfe
(74) *Attorney, Agent, or Firm*—John D. Russell

(57) ABSTRACT

A method of continuously estimating barometric pressure values for use in an engine control system. The vehicle includes an manifold absolute pressure (MAP) sensor, ambient air temperature sensor and a throttle position sensor. The method comprises the steps of determining the manifold absolute pressure, ambient air temperature, and throttle position. When the throttle position is at wide-open throttle, the method generates a barometric pressure value ($\hat{P}_a^{new}$) as a function of the manifold absolute pressure value (P) and previously estimated barometric pressure. Otherwise, the method generates a barometric pressure value as a function of the manifold absolute pressure value (P), and an estimated intake manifold pressure ($\hat{P}$) and estimated mass airflow ($\hat{\dot{m}}_{th}$). In a further embodiment, a mass airflow sensor is also used to generate the estimated barometric pressure value when the engine is not operating at wide-open throttle.

12 Claims, 2 Drawing Sheets

METHOD OF ESTIMATING BAROMETRIC PRESSURE IN AN ENGINE CONTROL SYSTEM

TECHNICAL FIELD

The present invention relates to an engine control system and method and more particularly to a method for estimating barometric pressure for use in a direct injection stratified charge (DISC) engine control scheme.

BACKGROUND OF THE INVENTION

Gasoline DISC engine technology has the potential of improving fuel economy through the use of stratified combustion, which significantly extends the lean burn limit and reduces pumping losses in the engine. Compared with a conventional port fuel injection (PFI) gasoline engine, a DISC engine is more complicated in its hardware and operating strategy. Like a PFI engine, a DISC engine consists of an intake manifold, combustion chambers, and an exhaust system. Its hardware design and configuration, however, are different from a PFI engine in several key aspects.

A DISC engine can effect two distinct modes of operation by properly timing the fuel injection in relation to other engine events. By injecting early in the intake stroke, there is enough time for the mixing of air and fuel to form a homogeneous charge by the time the ignition event is initiated. On the other hand, by injecting late in the compression stroke, the special combustion chamber design and the piston motion will lead to the formation of a stratified charge mixture that is overall very lean, but rich around the spark plug.

Changes in altitude result in changing ambient air pressure which, in turn, affects the density of air. Air density limits the amount of air change and, hence, available engine torque at a given engine speed and throttle position. Therefore, it is preferable to have barometric pressure information available to the engine controller so that adjustments can be made accordingly to prevent performance degradation.

Furthermore, barometric pressure sensors add cost to the vehicle. Thus, it is desirable in both port fuel injected (PFI) and DISC engines to have a robust control scheme without the need for a barometric pressure sensor and provides a robust estimate of barometric pressure for all engine operating conditions.

SUMMARY OF THE INVENTION

It is an object of the present invention to provide an improved engine control method that eliminates the need for a barometric pressure sensor and provides a robust estimate of barometric pressure for all engine operating conditions.

The foregoing and other objects are attained by a method of continuously estimating barometric pressure values for use in an engine control system. The vehicle includes an manifold absolute pressure (MAP) sensor, ambient air temperature sensor and a throttle position sensor. The method comprises the steps of determining the manifold absolute pressure, ambient air temperature, and throttle position. When the throttle position is at wide-open throttle, the method generates a barometric pressure value $\hat{P}_a^{new}$ as a function of the manifold absolute pressure value (P). Otherwise, the method generates a barometric pressure value as a function of the manifold absolute pressure value (P), and an estimated intake manifold pressure $\hat{P}$and estimated mass airflow $\hat{\dot{m}}_{th}$.

In a further embodiment, the vehicle includes a manifold absolute pressure (MAP) sensor, mass airflow sensor (MAF), ambient air temperature sensor and a throttle position sensor. The method comprises the steps of determining the manifold absolute pressure, mass airflow, ambient air temperature, and throttle position. When the throttle position is at wide-open throttle, the method generates a barometric pressure value $\hat{P}_a^{new}$ as a function of the manifold absolute pressure value (P). Otherwise, the method generates a barometric pressure value as a function of the manifold absolute pressure value and mass airflow value $\hat{\dot{m}}_{th}$.

An advantage of the present invention is that it eliminates the need for a barometric pressure sensor and thereby reduces the overall vehicle cost. Another advantage is that it provides a robust estimate of barometric pressure for all engine operating conditions, including partial load and WOT.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

DETAILED DESCRIPTION OF THE PREFERRED EMBODIMENT(S)

Figure 1:
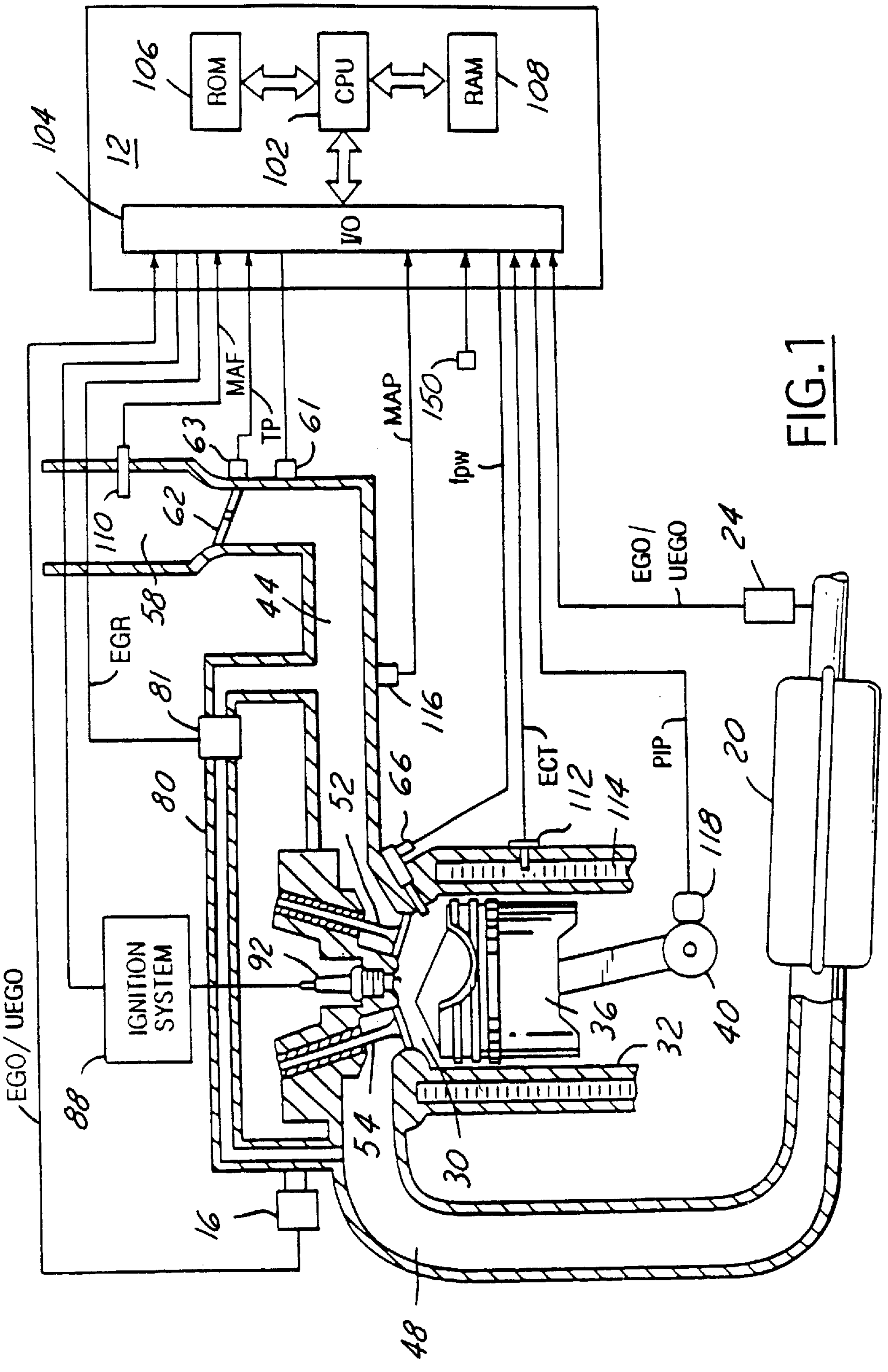
FIG. 1 is a block diagram of a DISC engine system where the present invention may be used to advantage.

Although the present method may be utilized in a PFI engine environment, it will be discussed in the context of a DISC engine with the understanding that it is not intended to be limited thereto. Referring now to FIG. 1, there is shown a block diagram of a DISC engine system. The DISC engine system includes the engine 10 comprising a plurality of cylinders, one cylinder of which shown in FIG. 1, is controlled by an electronic engine controller 12. In general, controller 12 controls the engine air, fuel (timing and quality), spark, EGR, etc., as a function of the output of sensors such as exhaust gas oxygen sensor 16 and/or proportional exhaust gas oxygen sensor 24. Continuing with FIG. 1, engine 10 includes a combustion chamber 30 and cylinder walls 32 with piston 36 positioned therein and connected to a crankshaft 40. Combustion chamber 30 is, shown communicating with intake manifold 44 and exhaust manifold 48 via respective intake valve 52 and exhaust valve 54. Intake manifold 44 is shown communicating with throttle body 58 via throttle plate 62. Preferably, throttle plate 62 is electronically controlled via drive motor 61. The combustion chamber 30 is also shown communicating with a high pressure fuel injector 66 for delivering fuel in proportion to the pulse width of signal FPW from controller 12. Fuel is delivered to the fuel injector 66 by a fuel system (not shown) which includes a fuel tank, fuel pump, and high pressure fuel rail.

The ignition system 88 provides ignition spark to the combustion chamber 30 via the spark plug 92 in response to the controller 12.

Controller 12 as shown in FIG. 1 is a conventional microcomputer including a microprocessor unit 102, input/output ports 104, read-only memory 106, random access memory 108, and a conventional data bus. Controller 12 is shown receiving various signals from sensors coupled to the engine 10, in addition to those signals previously discussed, including: measurements of inducted mass airflow (MAF) from mass airflow sensor 110, coupled to the throttle body 58; engine coolant temperature (ECT) from temperature sensor 112 coupled to the cooling sleeve 114; a measurement of manifold pressure (MAP) from manifold sensor 116 coupled to intake manifold 44; throttle position (TP) from throttle position sensor 63; ambient air temperature from temperature sensor 150; and a profile ignition pickup signal (PIP) from Hall effect sensor 118 coupled to crankshaft 40.

The DISC engine system of FIG. 1 also includes a conduit 80 connecting the exhaust manifold 48 to the intake manifold 44 for exhaust gas recirculation (EGR). Exhaust gas recirculation is controlled by EGR valve 81 in response to signal EGR from controller 12.

The DISC engine system of FIG. 1 further includes an exhaust gas after-treatment system 20 which includes a three-way catalyst (TWC) and a lean $NO_x$ trap (LNT).

Figure 2:
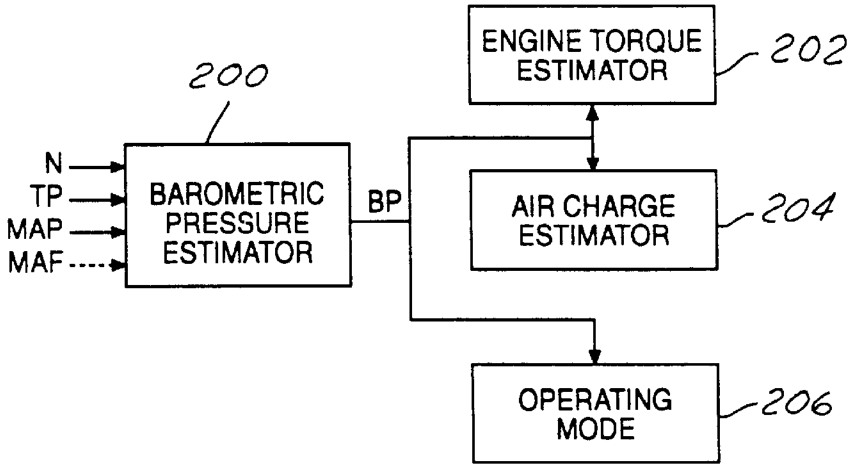
FIG. 2 is a block diagram of a control system where the present invention may be used to advantage.
Figure 3:
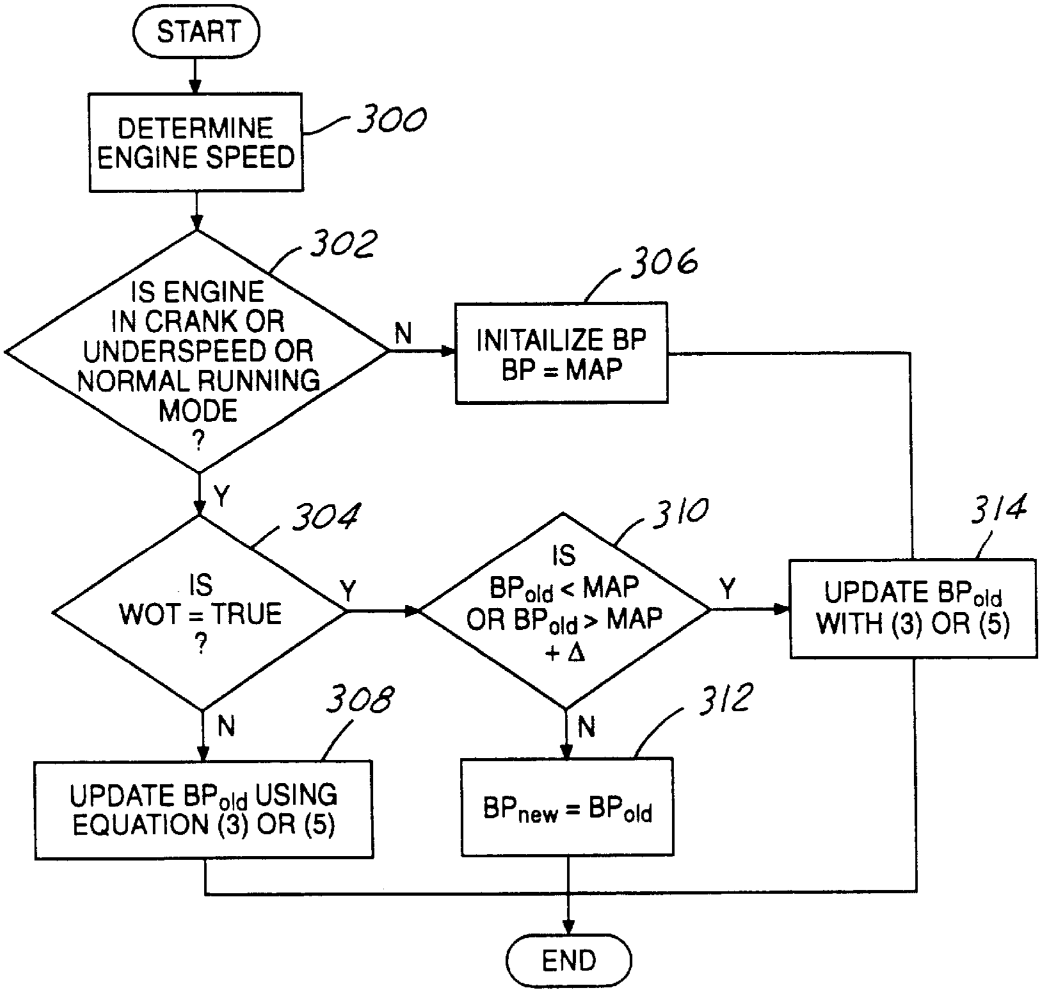
FIG. 3 is a logic flow diagram of the present method of estimating barometric pressure in an engine control scheme.

Referring now to FIG. 2, there is shown a block diagram of a control scheme where the present method may be used to advantage. The barometric pressure estimator which is described in detail below with reference to FIG. 3, is shown in block 200. The estimator 200 receives as inputs the engine speed signal (N) from the PIP signal, throttle position (TP) from the throttle position sensor 63, MAP and, optionally, MAP. The estimator then generates a value representing the present barometric pressure (BP) for use by the engine torque estimator 202 and/or air charge estimator 204. The BP signal can also be used to dictate the operating mode 206 of the engine—stratified or homogeneous. Preferably, these functional blocks 200, 202, 204, 206 are contained within the controller 12, although one or more of them could be stand-alone sub-controllers with an associated CPU, memory, I/O ports and databus. Of course, the actual engine control scheme can be any engine control method that uses BP as an input to generate desired engine operating values such as fueling rate, spark timing and airflow.

In a first embodiment of the present method, measurements of intake manifold absolute pressure (MAP) and mass airflow (MAF) are both available to the controller. In this case, the inventive method starts from the standard orifice equation for the engine throttle body:

$$\dot{m}_{th} = f(\theta)\frac{P_a}{\sqrt{T_a}}\,g\left(\frac{P}{P_a}\right) \tag{1}$$

where P, $P_a$ and $T_a$ is the intake manifold pressure(kPa), ambient pressure (kPa) and ambient temperature (K) respectively, $\dot{m}_{th}$ is the air mass flow rate through the throttle, θ is the throttle valve position and f(θ) represents the effective flow area which depends on the geometry of the throttle body. The function g depends on the pressure ratio across the throttle body which can be approximated by:

$$g\left(\frac{P}{P_a}\right) = 1 \quad \text{for } P/P_a \le 0.5 \tag{2}$$

$$g\left(\frac{P}{P_a}\right) = \frac{2P}{P_a}\sqrt{\frac{P_a}{P}} - 1 \quad \text{for } P/P_a > 0.5$$

Since all of the variables in equation (1) are either measured or known, except barometric pressure $P_a$, equation (1) could be used to solve for $P_a$. It has been found, however, that this solution leads to an estimate of $P_a$, which is very susceptible to measurement noises, especially during high intake manifold pressure conditions (such as in the stratified operation and lean homogeneous operation). Thus, the present method uses the following estimation equation which overcomes this deficiency and provides a robust estimation for the barometric pressure for WOT operation and all other engine operating states:

$$\text{for } WOT, \quad \hat{P}_a^{new} = \hat{P}_a^{old} + \gamma_1\left(P - \hat{P}_a^{old}\right) \tag{3}$$

$$\hat{P}_a^{new} = \hat{P}_a^{old} + \gamma_2\frac{\dot{m}_{th}}{1+\dot{m}_{th}^2}\left(\dot{m}_{th} - \hat{\dot{m}}_{th}\right) \quad \text{else}$$

where $\dot{m}_{th}$, P are measured flow and intake manifold pressure, $\hat{\dot{m}}_{th}$ is calculated as:

$$\hat{\dot{m}}_{th} = f(\theta)\frac{\hat{P}_a^{old}}{\sqrt{T_a}}\,g\left(\frac{P}{\hat{P}_a^{old}}\right) \tag{4}$$

and $\gamma_1$, $\gamma_2$ are adaptation gains which can be calibrated to achieve desired performance. The method is employed in real-time and, thus, the representations "old" and "new" represent the previously determined values and presently determined values, respectively. In equation (3), the barometric pressure estimation is adjusted incrementally according to the prediction error $\dot{m}_{th}-\hat{\dot{m}}_{th}$, to desensitize it to the measurement noises.

In a second embodiment of the present method, only a manifold absolute pressure (MAP) sensor is included in the engine sensor set. In this case where MAF measurement is not available, the following equation is used to update the barometric pressure for WOT and all other engine operating states:

$$\text{for } WOT, \quad \hat{P}_a^{new} = \hat{P}_a^{old} + \gamma_1\left(P - \hat{P}_a^{old}\right) \tag{5}$$

$$\hat{P}_a^{new} = \hat{P}_a^{old} + \gamma_2\frac{P}{1+P^2}\left(P - \hat{P}\right) \quad \text{else}$$

where $\hat{P}$ and $\hat{\dot{m}}_{th}$ are the estimated intake manifold pressure and air flow calculated from:

$$\hat{\dot{m}}_{th} = f(\theta)\frac{\hat{P}_a^{old}}{\sqrt{T_a}}\,g\left(\frac{P}{\hat{P}_a^{old}}\right), \quad \hat{P} = K\left(\hat{\dot{m}}_{th} - h(N, P)\right) \tag{6}$$

The function h is the engine pumping term which is obtained from engine mapping data and the constant K is calibrated using dynomometer data. In equation (5), the barometric pressure is updated according to the prediction error in the intake manifold pressure.

In both embodiments, the engine torque, the cylinder air charge, and stratified lean limit are scaled based on the barometric pressure estimation as shown, for example, in FIG. 2.

Referring now to FIG. 3, there is shown a logic flow diagram of a barometric pressure estimator according to the present invention. Two estimator schemes are presented in FIG. 3 depending upon the vehicle sensor set.

In step 300, the engine speed (N) is determined. In step 302, the system determines the operating mode of the engine. If the engine is in normal running (running, crank or underspeed) mode, the logic continues to step 304. Otherwise, the engine would be in the "key-on" state. The barometric pressure value is initialized to be approximately equal to MAP in step 306. In step 304, it is determined whether the engine is operating at wide-open throttle (WOT). If not, the value for $P_{old}$ is updated according to equation (3) or equation (5) in step 308 depending upon the sensor set available, i.e., MAP only or MAP and MAF. If, however, the engine is operating at WOT, the logic branches to step 310. If a WOT condition exists, a deadband is applied in step 310 to prevent BP adaptation when the estimated BP is slightly higher (Δ) than the intake pressure. In such cases, the new value for BP is set equal to the previous in step 312. Otherwise, the BP value is updated according to equation (3) or (5) for the WOT condition, depending upon the available sensor set.

In the case of PFI engines, the function f(θ) represents an effective area term that takes into account both the throttle and air bypass valve openings.

The present method can also be modified to account for pulsations in the measurement of P and $\dot{m}_{th}$ which are caused by engine intake events. The effects of pulsations on the integrity of the BP estimation scheme can be improved by averaging the measurement over each engine event, or by using other known filtering techniques. The present method can also be integrated with other throttle body adaptive algorithms designed to compensate for throttle body leakage or other variations. Furthermore, rather than updating barometric pressure at every sample time, the value could be periodically determined at predefined intervals.

From the foregoing, it can be seen that there has been brought to the art a new and improved barometric pressure estimating scheme for use in an engine control strategy. While the invention has been described in connection with one or more embodiments, it should be understood that the invention is not limited to those embodiments. For instance, the estimating method of the present invention may be used in either a DISC or PFI engine control strategy. Accordingly, the invention covers all alternatives, modifications, and equivalents, as may be included within the spirit and scope of the appended claims.

What is claimed is:

1. A method of continuously estimating barometric pressure ($\hat{P}_a^{new}$) for use in an engine control system for a vehicle equipped with a throttle position sensor, the method comprising the steps of:

determining a throttle position value (θ) from said throttle position sensor; and determining a manifold absolute pressure (P) value; and when said throttle position is at wide-open throttle, generating a first barometric pressure value ($\hat{P}_a^{new}$) as a function of said manifold absolute pressure value, otherwise, generating a second barometric pressure value as a function of said manifold absolute pressure value and said throttle position value.

2. The method according to claim 1 further comprising the steps of:

determining an engine speed value for said engine;

determining an ambient air temperature value ($T_a$); and when said throttle position is at wide-open throttle, generating said first barometric pressure value ($\hat{P}_a^{new}$) as a function of a previously determined barometric pressure value ($\hat{P}_a^{old}$) and said manifold absolute pressure value, otherwise, generating said second barometric pressure value as a function of said previously determined barometric pressure value ($\hat{P}_a^{old}$), engine speed value, manifold absolute pressure value, ambient air temperature value and said throttle position value.

3. The method according to claim 2 wherein said first barometric pressure value is generated according to the following equation:

$$\hat{P}_a^{new}=\hat{P}_a^{old}+\gamma_1(P-\hat{P}_a^{old})$$

and said second barometric pressure value is generated according to the following equation:

$$\hat{P}_a^{new}=\hat{P}_a^{old}+\gamma_2\frac{P}{1+P^2}(P-\hat{P})$$

wherein $\hat{P}$ represents an estimated manifold pressure value defined by the following equation:

$$\hat{P}=K(\hat{\dot{m}}_{th}-h(N,P))$$

wherein h is a predefined engine pumping term and K is a calibratable constant and $\hat{\dot{m}}_{th}$ represents an estimated mass airflow according to the following equation:

$$\hat{\dot{m}}_{th}=f(\theta)\frac{\hat{P}_a^{old}}{\sqrt{T_a}}g\left(\frac{P}{\hat{P}_a^{old}}\right)$$

wherein g represents a function of pressure ratio across the vehicle throttle body and f(θ) represents a throttle flow area corresponding to said throttle position value and wherein $\gamma_1$ and $\gamma_2$ are calibratable gain constants.

4. The method according to claim 1 further comprising the steps of:

determining an operating state of said engine; and setting said estimated barometric pressure value ($\hat{P}_a^{new}$) approximately equal to said manifold absolute pressure value (P) as a function of said engine operating state.

5. The method according to claim 1 further comprising the step of:

when said throttle position is at wide-open throttle, setting said estimated barometric pressure value ($\hat{P}_a^{new}$) equal to the previously estimated barometric pressure value ($\hat{P}_a^{old}$) when said previously estimated barometric pressure value is within a predetermined range of said manifold absolute pressure value (P).

6. The method according to claim 1 wherein said engine is a direct-injection stratified charge engine.

7. The method according to claim 1 wherein the step of determining a manifold absolute pressure value (P) includes the step of measuring P from a MAP sensor and the step of determining a mass airflow value ($\dot{m}_{th}$) includes the step of measuring $\dot{m}_{th}$ from a MAF sensor.

8. An engine system for a vehicle comprising:

an intake manifold absolute pressure (MAP) sensor for providing a manifold absolute pressure value (P);

an ambient air temperature sensor for providing an ambient air temperature value ($T_a$);

a throttle position sensor for providing a throttle position value (θ); and an engine controller adapted to receive as inputs said manifold absolute pressure value (P), ambient air temperature value ($T_a$), and throttle position value (θ), and when said throttle position is at wide-open throttle, generate a first barometric pressure value ($\hat{P}_a^{new}$) as a function of said manifold absolute pressure value, otherwise, generating a second barometric pressure value as a function of an engine speed value, manifold absolute pressure value, ambient air temperature value and said throttle position value.

9. The system of claim 8 wherein said engine controller is further adapted to determine an operating state of said engine, and set said estimated barometric pressure value ($\hat{P}_a^{new}$) approximately equal to said manifold absolute pressure value (P) as a function of said engine operating state.

10. The system of claim 8 wherein said engine controller is further adapted to, when said throttle position is at wide-open throttle, set said estimated barometric pressure value ($\hat{P}_a^{new}$) equal to a previously estimated barometric pressure value ($\hat{P}_a^{old}$) when said previously estimated barometric pressure value is within a predetermined range of said manifold absolute pressure value (P).

11. The system of claim 8 further comprising a mass airflow (MAF) sensor for providing a mass airflow value ($\dot{m}_{th}$) and wherein said engine controller is adapted to, when said throttle position is at wide-open throttle, generate said first barometric pressure value ($\hat{P}_a^{new}$) as a function of said manifold absolute pressure value, otherwise, generate a second barometric pressure value as a function of said manifold absolute pressure value, said mass airflow value and said throttle position value.

12. The system of claim 8 wherein said engine is a direct-injection stratified charge engine.

* * * * *